(No Model.)
D. P. DOBBINS.
ALARM WHISTLE FOR STEAM BOILERS.
No. 334,519. Patented Jan. 19, 1886.
Fig. 1.
Fig. 2.
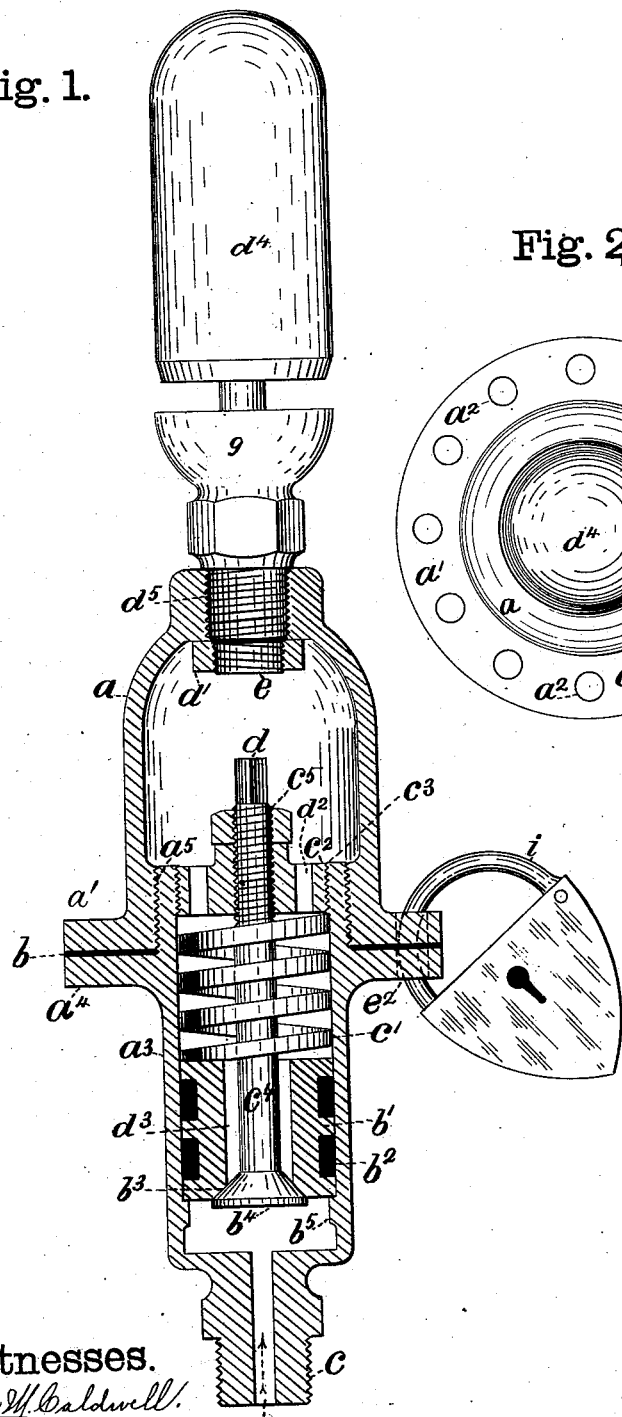
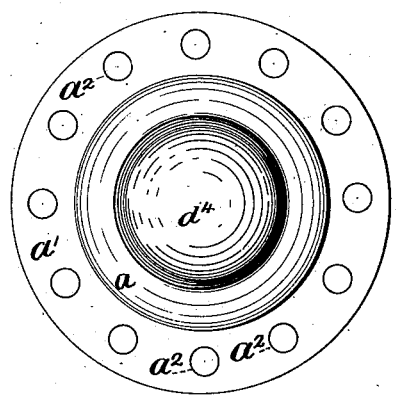
Witnesses.
Jennie M. Caldwell
Arthur J. Sangster
Inventor.
David P. Dobbins.
By James Sangster
atty.

United States Patent Office.

DAVID P. DOBBINS, OF BUFFALO, NEW YORK.

ALARM-WHISTLE FOR STEAM-BOILERS.

SPECIFICATION forming part of Letters Patent No. 334,519, dated January 19, 1886.

Application filed November 23, 1885. Serial No. 183,695. (No model.)

*To all whom it may concern:*

Be it known that I, DAVID P. DOBBINS, a citizen of the United States, residing in Buffalo, in the county of Erie and State of New York, have invented certain new and useful Improvements in Alarm-Whistles for Steam-Boilers, of which the following is a specification.

The object of this invention is to produce a simple and effectual means for instantly sounding an alarm when the pressure in a steam-boiler has gone beyond the limit to which it may be set, all of which will be fully and clearly hereinafter shown, described, and claimed, by reference to the accompanying drawings, in which—

Figure 1 is a vertical central section through all of the device except the spring, valve, valve-stem, and whistle; and Fig. 2 represents a top view.

In said drawings, $a$ represents the upper portion of the casing. It is provided with a flange, $a'$, having a series of perforations, $a^2$.

$a^3$ is the lower portion of the case. It is also provided with a flange, $a^4$, and a screw portion, $a^5$, adapted to fit the interior screw-thread in the case $a$. Between the flanges $a'$ $a^4$ is a packing, $b$, of some suitable material— for instance, sheet-lead, or other equivalent material. The casing $a^3$ is turned out true, so as to adapt it to receive the piston $b'$. This piston is provided with metallic packing-rings $b^2$, and with a valve-seat, $b^3$, adapted to receive the valve $b^4$. On the inside of the case $a^3$ is an inwardly-projecting rim, $b^5$, to prevent the piston from coming down too low. If required, this rim $b^5$ may be attached to or form a part of the piston, like a downwardly-projecting piece or rim, and will answer the same purpose as the rim $b^5$. The lower part of the case $a^3$ is provided with a screw portion, $c$, adapting it to screw into some convenient part of the boiler. The spiral spring $c'$ is placed in the casing on the top of the piston, and is held down in place by the upper portion, $c^2$, which screws into the upper portion of the case $a^3$, as shown by the letter $c^3$, and is provided with perforations $d^2$, to let the steam through; but this piece $c^2$ may, if desired, be made in one piece with the case $a^3$.

The valve $b^4$ is provided with a valve-stem, $c^4$, having a screw portion, $c^5$, adapted to engage with the screw-threaded opening through the portion $c^2$, and a square wrench-section, $d$. The piston is provided with an opening, $d^3$, through it, to permit the steam to pass through when the valve is open. The steam-whistle $d^4$ is made in the ordinary way, and is provided with a screw-shank having a right and left hand screw, $d^5$ and $e$. The right-hand screw portion $d^5$ screws into the top of the case $a$, and the left-hand screw portion $e$ is provided with a nut, $d'$. The object of this construction is to prevent the whistle from being taken off without getting inside first and taking off the nut $d'$. The flange $a^4$ of the case $a^3$ is provided with one or more perforations, $e^2$.

When the parts are all together, the hasp of a seal or other suitable lock is passed through one of the perforations $a^2$ in the flange $a'$ and one of the perforations $e^2$ in the flange $a^4$. It will be seen that when the lock is in place and locked it will be impossible to unscrew and take off the case $a$; and consequently the whistle cannot be taken off, so that the parts cannot be got at to be tampered with unless the lock be broken.

In setting the device to act at a certain required pressure, it is first put onto a suitable boiler having a pressure-gage connected with it, the upper case being taken off, and then the valve-stem is turned by a wrench applied to the nut portion $d$ and the valve screwed up, bringing the piston up with it and compressing the spring $c'$ until it is just able to balance the pressure required, after which the parts are all put together, as above mentioned.

The operation of the invention is as follows: When the steam gets above the point at which the device is set, it will force the piston $b'$ upward against the spring, and as the valve $b^4$ is rigidly fixed and immovable, as the piston moves up it opens a passage between the valve-seat and valve, so that the steam passing in through the opening $f$ passes up through the passage $d^3$ through the piston, and up through the opening $d^2$, and from thence to the whistle and sounds an alarm, thereby giving an additional warning when the pressure gets too high.

I have represented the construction shown in Fig. 1 so as to adapt it to receive the steam-whistles now in use; but, if desired, the lower part, $g$, of the whistle, and the upper case, $a$, may be made all in one piece, in which case the right and left hand screws could be dispensed with, as it would then be impossible to separate the two without breaking them, and the seal-lock would secure the portions $a$ $a^3$. The parts $a\ a^3$, instead of being provided with a screw portion, $a^5$, may have a series of holes in the flanges, and be secured together by bolts, if desired, without changing the nature of the invention.

I claim as my invention—

An alarm-whistle for steam-boilers, consisting of a cylindrical casing, $a\ a^3$, adapted to be secured together, substantially as specified, one portion having a perforated portion, $c^2$, provided with a vertically-adjustable valve-stem capable of being rigidly fixed at any desired point, a movable piston, and a spring interposed between the piston and portion $c^2$, in combination with a steam-whistle, substantially as described.

D. P. DOBBINS.

Witnesses:
 JENNIE M. CALDWELL,
 ARTHUR J. SANGSTER.